US008677298B1

(12) United States Patent
Manohararajah et al.

(10) Patent No.: US 8,677,298 B1
(45) Date of Patent: Mar. 18, 2014

(54) PROGRAMMABLE DEVICE CONFIGURATION METHODS ADAPTED TO ACCOUNT FOR RETIMING (71) Applicant: Altera Corporation, San Jose, CA (US)

(72) Inventors: Valavan Manohararajah, Scarborough (CA); David Lewis, Toronto (CA); David Galloway, Toronto (CA); Ryan Fung, Mississauga (CA)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 13/733,982

(22) Filed: Jan. 4, 2013

(51) Int. Cl.
 G06F 17/50 (2006.01)
(52) U.S. Cl.
 USPC ............ 716/116; 716/121; 716/128; 716/138
(58) Field of Classification Search
 USPC .................. 716/116, 121, 128, 138
 See application file for complete search history.

(56) References Cited

U.S. PATENT DOCUMENTS

| 5,663,888 | A   | * | 9/1997  | Chakradhar ................. 716/104 |
| 6,466,898 | B1  |   | 10/2002 | Chan |
| 7,299,458 | B2  |   | 11/2007 | Hammes |
| 7,594,195 | B2  |   | 9/2009  | Jain et al. |
| 7,926,016 | B1  |   | 4/2011  | Sundararajan et al. |
| 8,286,137 | B2  |   | 10/2012 | Kahlon et al. |
| 8,296,696 | B1  | * | 10/2012 | Chiu et al. .................... 716/104 |
| 8,402,408 | B1  | * | 3/2013  | van Antwerpen et al. .... 716/116 |
| 2002/0162097 | A1 |   | 10/2002 | Meribout |
| 2004/0068711 | A1 | * | 4/2004  | Gupta et al. .................... 716/18 |
| 2008/0276209 | A1 | * | 11/2008 | Albrecht et al. ................. 716/6 |
| 2009/0146686 | A1 | * | 6/2009  | Voogel et al. .................. 326/38 |
| 2010/0058261 | A1 |   | 3/2010  | Markov et al. |
| 2012/0227026 | A1 |   | 9/2012  | Goldman et al. |

OTHER PUBLICATIONS

Betz, V., et al., *Architecture and CAD for Deep-Submicron FPGAs*, Kluwer Academic Publishers, Feb. 1999.
Carloni, L.P., et al., "A Methodology for Correct-by-Construction Latency Insensitive Design", *ICCAD '99: Proceedings of the 1999 IEEE/ACM International Conference on Computer-aided Design*, pp. 309-315, 1999.
Cong, J., et al., "Physical Planning with Retiming", *ICCAD-2000: Proceedings of the 2000 IEEE/ACM International Conference on Computer-aided Design*, pp. 2-7, 2000.
Cormen, T.H., et al., *Introduction to Algorithms*, MIT Press and McGraw Hill, Third Edition, pp. 651-655, 2009.
Dasdan, A., "Experimental Analysis of the Fastest Optimum Cycle Ratio and Mean Algorithms", *ACM Transactions on Design Automation of Electronic Systems*, vol. 9, No. 4, pp. 385-418, Oct. 2004.
Deokar, R.B., et al., "A Fresh Look at Retiming via Clock Skew Optimization", *DAC '95: Proceedings of the 32nd Annual ACM/IEEE Design Automation Conference*, pp. 310-315, 1995.

(Continued)

*Primary Examiner* — Suresh Memula
(74) *Attorney, Agent, or Firm* — Ropes & Gray LLP; Jeffrey H. Ingerman (57) ABSTRACT A method of configuring an integrated circuit device with a user logic design includes analyzing the user logic design to identify critical and near-critical cyclic logic paths within the user logic design, applying timing optimizations to the critical and near-critical cyclic logic paths, and retiming logic paths other than the critical and near-critical cyclic logic paths.

26 Claims, 6 Drawing Sheets (56) References Cited

OTHER PUBLICATIONS

Hurst, A.P., et al., "Physical Placement Driven by Sequential Timing Analysis", *ICCAD-2004: Proceedings of the 2004 IEEE/ACM International Conference on Computer-aided Design*, pp. 379-386, 2004.

Leiserson, C.E., et al., "Retiming Synchronous Circuitry", Digital Equipment Corporation, Aug. 20, 1986, published in *Algorithmica*, vol. 6, No. 1, pp. 5-35, Jun. 1991.

Maheshwari, N., et al., *Timing Analysis and Optimization of Sequential Circuits*, Springer, pp. 9, 14-17, 1998.

Manohararajah, V., et al., "Heuristics for Area Minimization in LUT-Based FPGA Technology Mapping", *IEEE Transactions on CAD*, vol. 25, No. 11, pp. 2331-2340, Nov. 2006.

Singh, D.P., et al., Integrated Retiming and Placement for Field Programmable Gate Arrays, *FPGA'02: ACM International Symposium on Field Programmable Gate Arrays*, pp. 67-76, Feb. 2002.

Weaver, N., et al., "Post-Placement C-Slow Retiming for the Xilinx Virtex FPGA", *FPGA'03: ACM International Symposium on Field Programmable Gate Arrays*, pp. 185-194, Feb. 2003.

Weaver, N., et al., "The Effects of Datapath Placement and C-Slow Retiming on Three Computational Benchmarks", *FCCM'02: The 10th Annual IEEE Symposium on Field-Programmable Custom Computing Machines*, pp. 303-306, Feb. 2003.

Eguro, K., "Supporting High-Performance Pipelined Computation in Commodity-Style FPGAs", University of Washington doctoral dissertation, pp. 1-168 (2008).

Li, S., et al., "QuickRoute: A Fast Routing Algorithm for Pipelined Architectures", *2004 IEEE International Conference on Field-Programmable Technology* pp. 73-80 (2004).

Sharma, A., et al., "PipeRoute: A Pipelining-Aware Router for FPGAs", *FPGA '03: Proceedings of the 2003 ACM/SIGDA eleventh international symposium on Field programmable gate arrays*, pp. 68-77 (Feb. 23-25, 2003).

Singh, D., et al., "The Case for Registered Routing Switches in Field Programmable Gate Arrays", *FPGA '01: Proceedings of the 2001 ACM/SIGDA ninth international symposium on Field programmable gate arrays*, pp. 161-169 (Feb. 11-13, 2001).

Tsu, W., et al., "HSRA: High-Speed, Hierarchical Synchronous Reconfigurable Array", *FPGA '99: Proceedings of the 1999 ACM/SIGDA seventh international symposium on Field programmable gate arrays*, pp. 125-134 (1999).

\* cited by examiner

PROGRAMMABLE DEVICE CONFIGURATION METHODS ADAPTED TO ACCOUNT FOR RETIMING

FIELD OF THE INVENTION

This invention relates to design or configuration methods for integrated circuit devices, including, e.g., field-programmable gate array (FPGAs) or other types of programmable logic devices (PLDs), and to design or configuration methods, for designing or configuring such devices, that account for the ability to retime the design or configuration.

BACKGROUND OF THE INVENTION

Early programmable devices were one-time configurable. For example, configuration may have been achieved by "blowing"—i.e., opening—fusible links. Alternatively, the configuration may have been stored in a programmable read-only memory. Those devices generally provided the user with the ability to configure the devices for "sum-of-products" (or "P-TERM") logic operations. Later, such programmable logic devices incorporating erasable programmable read-only memory (EPROM) for configuration became available, allowing the devices to be reconfigured.

Still later, programmable devices incorporating static random access memory (SRAM) elements for configuration became available. These devices, which also can be reconfigured, store their configuration in a nonvolatile memory such as an EPROM, from which the configuration is loaded into the SRAM elements when the device is powered up. These devices generally provide the user with the ability to configure the devices for look-up-table-type logic operations.

While it may have been possible to configure the earliest programmable logic devices manually, simply by determining mentally where various elements should be laid out, it was common even in connection with such earlier devices to provide programming software that allowed a user to lay out logic as desired and then translate that logic into a configuration for the programmable device. With current larger devices, it would be impractical to attempt to lay out the logic without such software. Similar software may be used to design fixed logic devices such as application-specific integrated circuits (ASICs).

Some user logic designs would be able to operate at higher clock speeds if the designs could be optimized. However, known configuration methods do not always take all possible optimizations into account.

SUMMARY OF THE INVENTION

Known configuration methods for programmable integrated circuit devices, as well as design methods for application-specific integrated circuits, optimize circuit designs by detecting the paths with the longest delay and applying optimization techniques to reduce or "crush" those delays. However, such techniques may not properly account for the ability to "retime" a design by moving registers within the design.

In particular, unidirectional or "feed-forward" logic paths are amenable to pipelining. On the other hand, cyclic logic paths (i.e., loops) are less amenable to pipelining. If a user logic design includes both feed-forward and cyclic logic paths, a technique that focuses on optimizing the path with the longest delay may focus on paths that can be shortened by retiming, while neglecting other, apparently shorter, paths that remain as the longer paths after retiming of other paths. However, if the design method could account for the improvement available from retiming, optimizations could be applied to those circuit paths that, while they appear shorter, are actually longer once retiming is applied.

The present invention provides methods for identifying those logic paths that are critical but cannot be shortened by retiming and therefore should be the focus of optimization efforts, with higher priority for optimization than those paths that can be shortened by retiming. Because the latter paths are those that are unidirectional, embodiments of the invention, with "awareness" of the availability of later retiming, identify cyclic logic paths, and in particular those cyclic paths that are critical and near-critical, so that those paths can be optimized, while other paths remain available to be shortened by retiming.

Therefore, in accordance with the present invention there is provided a method of configuring an integrated circuit device with a user logic design. The method includes analyzing the user logic design to identify critical and near-critical cyclic logic paths within the user logic design, applying timing optimizations to the critical and near-critical cyclic logic paths, and retiming logic paths other than the critical and near-critical cyclic logic paths.

A machine-readable data storage medium encoded with instructions for carrying out such a method also is provided.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which.

DETAILED DESCRIPTION OF THE INVENTION

Timing analysis under the assumption of the availability of retiming is known. Such methods attempt to approximate the cycle slack at every point in the circuit, where cycle slack is the amount of delay that can be added to a circuit connection before it impacts the optimal period. This is similar to slack in a traditional timing analysis, but assumes that registers may be freely moved to reduce the clock period. The cycle slack of each connection in the circuit can then be used to guide optimization tools in minimizing effects detrimental to the final retiming.

While determination of cycle slack is an accurate way of predicting the effects of final retiming, cycle slack is difficult to compute. The computational effort for accurate determination of cycle slack for each connection in a circuit is proportional to the square of the number of nodes in the circuit. Because of that complexity in computing cycle slack exactly, known methods produce approximations of cycle slack instead.

Specifically, cycle slack can be computed either exactly or approximately using a sequential timing analysis under the assumption that registers can be moved, considering each register as being capable of taking off a delay equivalent to the target clock period. When the timing analysis is carried out with respect a particular point of reference in the circuit, some registers take away some delay from a path while other circuit elements add delay to the path. Therefore, the actual positioning of the register is irrelevant, but its effect on the path is accounted for in the length. However, the slacks determined by a single sequential timing analysis are only valid in relation to the point of reference used.

As a result, if one were to use every single point in the circuit as a reference and perform multiple sequential timing analyses, then the true cycle slack could be obtained by calculating the minimum slack observed at each node over the multiple sequential timing analyses. However, this is far too complex for practical use. Therefore, various known approaches are used to approximate the cycle slack, with each approach introducing inaccuracies.

Approaches within embodiments of the present invention provide information to device configuration software via slacks and slack ratios, allowing the software to focus on the circuit topologies that limit final retiming.

Figure 1:
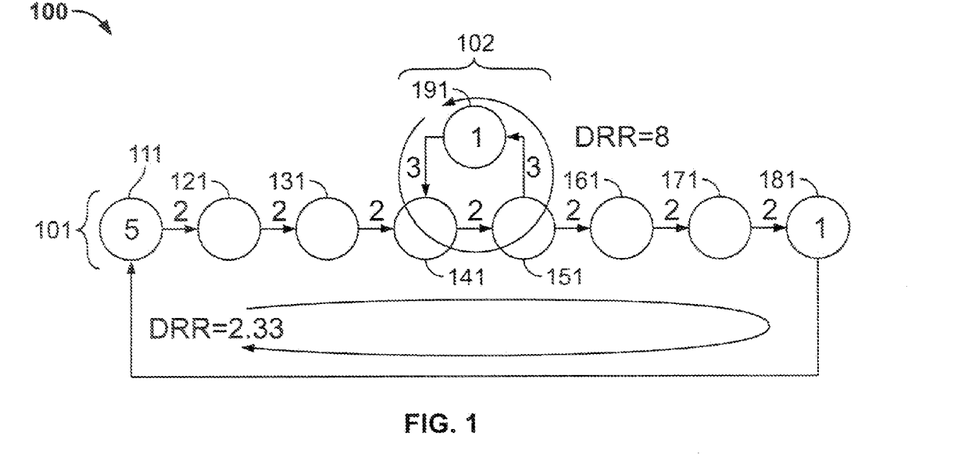
FIG. 1 shows an example of a circuit that may be optimized using embodiments of the present invention.

Circuits to be optimized may be represented by graph structures similar to that illustrated in FIG. 1, which shows one portion 100 of a much larger circuit. A unidirectional path 101 includes nodes 111, 121, 131, 141, 151, 161, 171 and 181, while cyclic path 102 includes nodes 141, 151 and 191. Unidirectional path 101 includes six registers—five near node 111 and one near node 181, while cyclic path 102 includes one register near node 191.

If unidirectional paths are considered to be cyclic (with inputs connected to outputs), a delay-to-register-ratio (DRR)—i.e., the total delay divided by the number of registers—can be computed for each path. In FIG. 1, the delays are shown between each node. Unidirectional path 101 has a total delay of 14 and a DRR of 14/6=2.33, while cyclic path 102 has total delay of 8 and a DRR of 8/1=8.

Retiming cannot achieve a clock period lower than the largest DRR of any cycle. Therefore, in accordance with embodiments of the invention, in order to focus on the circuit topologies that limit final retiming, the most critical cycles—i.e., those with the largest DRRs, should be found.

Figure 2:
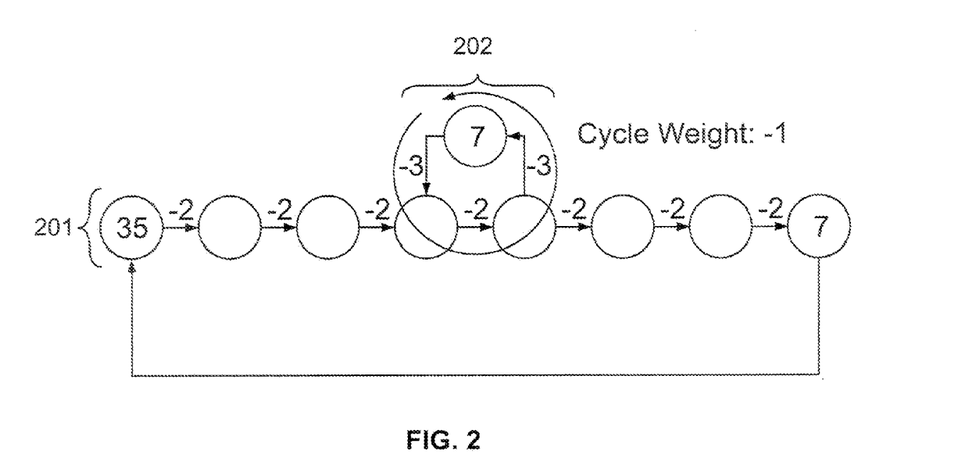
FIG. 2 shows an example of the application of a known optimization technique to the circuit of FIG. 1.

Critical cycles can be detected by techniques that find "negative cycles." According to one such technique, paths 101, 102 shown in FIG. 1 are converted to paths 201, 202 of FIG. 2 by multiplying each delay by −1, and assigning to each node with registers a delay equivalent to the number of registers multiplied by a target clock period. In the example of FIG. 2, the target clock period is 7. In FIG. 2, path 201 has a total weight of 35+7−(2×7)=28 and is therefore a "positive cycle," but path 202 has a total weight of 7−3−3−2=−1 and is therefore a "negative cycle." The maximum DRR of a circuit, as well as the critical cycle, can be found by starting with an estimate of the target period and doing a binary search to find the highest target period that creates a negative cycle (there are several known techniques for finding negative cycles). That negative cycle is the critical cycle, and that target period is the maximum DRR.

Although the foregoing describes how to find a single critical cycle with the maximum DRR, in reality there may be several cycles that have DRRs which are close to the maximum DRR and will cause problems for a retiming step. Those "near-critical" cycles can be found, e.g., by iterating the negative cycle finder and, whenever a negative cycle is found, identifying that cycle as a near-critical cycle and adding a small delay to every edge of that cycle. That cycle will no longer be negative, but running the negative cycle finder again may highlight another path that is now negative. This process can be iterated with the same target period until no more negative cycles are found. The iterations can continue at a lower target period, which can continue to be reduced, until some preset limit is reached, to find all near-critical cycles, with nearness determined by that limit.

It is known to drive circuit optimizations based on slacks that are computed by a timing analysis engine that is provided with an estimate of circuit delays. Similarly to cycle slack, defined above, slack is defined as the amount of delay that can be added to a node, or edge, before it exceeds the timing requirement for paths that use that node, or edge. This differs from cycle slack primarily in that there is no assumption that registers can move.

Optimization is preferably applied to nodes, or edges, with a low or zero slack. In some cases, slack ratios are used instead of slacks. Slack ratio is the ratio of the slack to the requirement at the node, or edge. A simple timing-driven cost function may be as follows:

$$\text{timing}_{cost} = \sum_{(i \in circuit)} [\text{delay}_i \times (1 - slackratio_i)]$$

Such a cost function favors delay improvements for circuit elements that have very low slack ratios at the cost of possibly increasing the delay for circuit elements that have a high slack ratio, and does not account for the possibility of retiming.

Where circuit design or configuration software already uses slacks or slack ratios in its cost calculations, a modification in accordance with the present invention can make the software retiming-aware. Slacks and slack ratios of circuit components that are involved in critical or near-critical cycles can be reduced, by moving registers, to cause the optimization tool to focus its efforts on those cycles. Similarly, slacks and slack ratios of circuit components that are not in a critical or near-critical cycle can be increased, by moving registers, to help provide some optimization flexibility. The exact modifications applied to the slacks and slack ratios may be a function of the desired result and may be determined empirically. For example, one embodiment may be to reduce the slacks and slack ratios of all nodes, or edges, in critical cycles to zero while increasing the slacks and slack ratios of all nodes, or edges not in critical cycles by a fixed amount.

The methods of computing cycle slacks can be further enhanced by carefully choosing reference points for sequential timing analysis. One possibility is to select as reference points one node selected from each of the critical and near-critical cycles. These selections can be updated during run time. For example, a placement routine may make several calls to a timing analysis routine to update its knowledge of slacks and slack ratios. During these calls a critical cycle finding routine can be run to provide a new source of reference points. These new reference points can be added to the set of reference points to be used during sequential timing analysis. Over time the set will grow to include more reference points in order to get an accurate picture of cycle slack at each node.

Cycle slacks can be converted into cycle slack ratios based on the number of registers that were used to obtain the cycle slack. Cycle slack ratio is a normalization of the slack ratio, resulting in a number between 0 and 1. As the cycle slack ratio for an element gets closer to 0, that element is considered more critical, while as the cycle slack ratio for an element gets closer to 1, that element is considered less critical. This quantity can be determined by tracking the number of registers in addition to arrival time and required time that are normally computed at each node as part of sequential timing analysis. One formula for converting cycle slacks into cycle slack ratios may be:

$$\text{cycle\_slackratio}_i = \text{cycle\_slack}_i / (\text{num\_registers}_i \times \text{clock\_period})$$

This formulation for converting cycle slacks into cycle slack ratios allows cycle slack ratios to be factored into timing cost.

Even though certain nodes or edges may have relatively high "regular" slacks or slack ratios that suggest that those nodes or edges are less critical than other nodes or edges, the moving of registers in accordance with embodiments of the invention can have the effect of changing the cycle slacks or cycle slack ratios for some or all nodes, so that the degrees of criticality indicated by the cycle slacks or cycle slack ratios may differ—in some cases significantly—from the degrees of criticality suggested by the regular slacks or slack ratios. In some embodiments, this difference in the effects of cycle slack ratios and regular slack ratios could be accounted for by combining the cycle slack ratio and the regular slack ratio using a weighting constant as follows:

$$\text{slackratio}_i = \alpha \times \text{cycle\_slackratio}_i + (1-\alpha) \times \text{regular\_slackratio}_i$$

The weighting constant, $\alpha$, would controls whether the slack ratio used in the timing cost is entirely based on cycle slack ratios, regular slack ratios, or some blend of the two.

According to other embodiments of the invention, the cost function used by the configuration or design software can be changed to add another component that tracks the size of critical cycles. One example of such an altered cost function may be:

$$\text{timing\_cost} = \alpha \times \left[\sum_{(i \in \text{circuit})} \text{delay}_i \times (1 - \text{slackratio}_i)\right] + \beta \times \left[\sum_{c \in \text{critical\_cycles}} (\text{length}_c / \text{registers}_c) \times \text{loop\_crit}_c\right]$$

where loop_crit is a quantity that weights each critical cycle so more attention is paid to the most critical cycle. This quantity could either reflect the current situation or could possibly include historical data on how critical a cycle was in the past. This cost function would track the length (i.e., the total delay) and number of registers of each critical cycle. Optimizations that reduce the size of critical loops will improve the new timing cost. Varying the parameters $\alpha$ and $\beta$ can trade off the amount of effort focused on traditional timing driven optimizations and retiming-aware optimizations.

As an alternative to applying sequential timing analysis and cycle slack, according to other embodiments of the invention, identification of the timing-critical portions of the design, under the assumption of a later retiming operation, may be based on clock skew. Such an approach can be integrated easily into an existing timing analysis infrastructure that understands clock skews. Preferably, the timing analysis understands both negative and positive clock skews, but in cases where negative skew is not supported, the clock domain can be shifted to convert negative skews into positive skews.

In accordance with this approach, a "virtual retiming" can be computed by applying skews to register inputs. A negative skew applied to a register clock input has the same effect as moving the register forward during a retiming operation, and a positive skew applied at a register clock input has the same effect as moving the register backward during a retiming operation.

Figure 3:
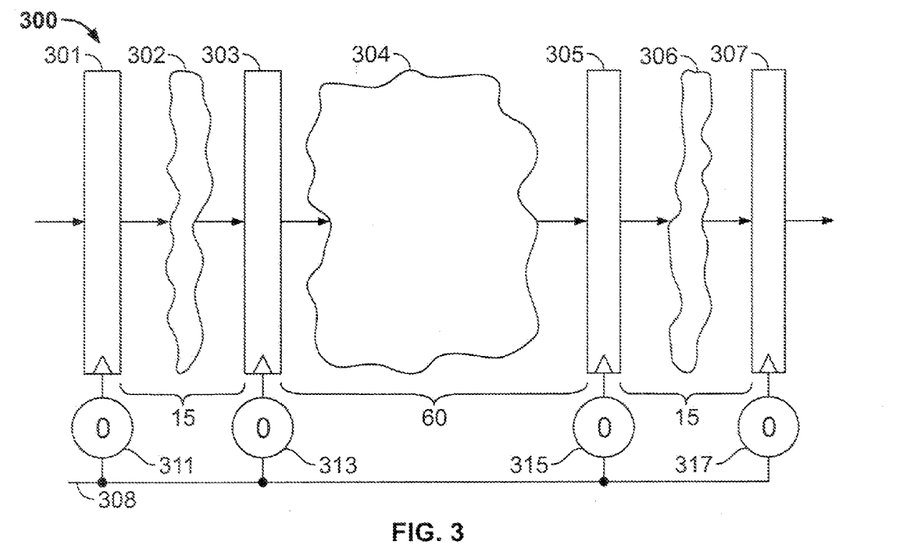
FIG. 3 shows another example of a circuit that may be optimized using embodiments of the present invention.

For example, the circuit 300 illustrated in FIG. 3 has a first register 301, followed by a first area of logic 302, followed by second register 303, followed by a second area of logic 304, followed by third register 305, followed by a third area of logic 306, followed by a fourth register 307. Logic 302 has a delay of 15 units, logic 304 has a delay of 30 units, and logic 306 has a delay of 15 units, for a total delay of 60 units. The registers are clocked by a clock 308, with each register having a respective skew 311, 313, 315, 317), all of which are 0.

Figure 4:
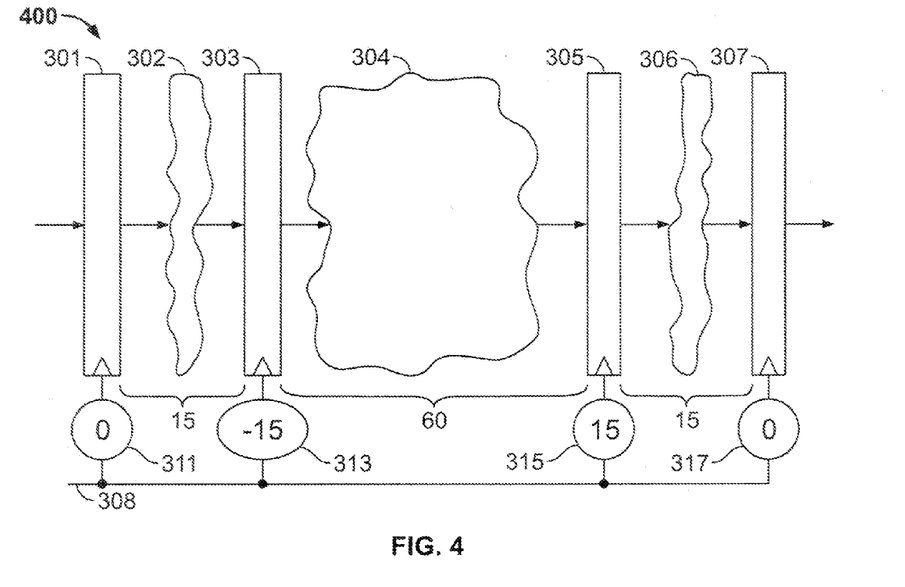
FIG. 4 shows an example of optimization of the circuit of FIG. 3 in accordance with an embodiment of the present invention.
Figure 5:
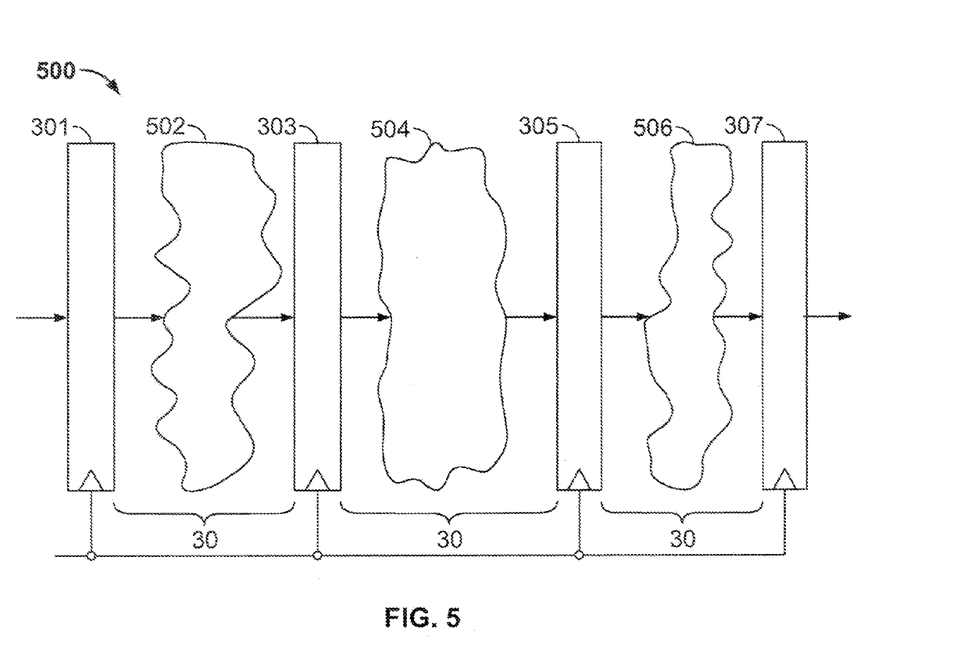
FIG. 5 shows the effective circuit resulting from the optimization of FIG. 4.

As shown in FIG. 4, a skew of −15 can be applied at 313) and a skew of +15 can be applied at 315, which has the same effect as moving register 303 15 units forward and moving register 305 15 units backward, reducing the critical delay of circuit 400 from 60 units to 30 units. The resulting effective circuit 500 is shown in FIG. 5, where the registers 303 and 305 are shown in their effective positions, and the total delay of 90 units (15+60+15) has been equally distributed (30+30+30) among retimed logic areas 502, 504, 506.

By treating the retiming problem as one of computing a set of skews, a significant amount of computational effort is avoided. A real retiming solution would have to reposition registers which would mean that the circuit topology is changed, and many internal data structures would have to be destroyed and rebuilt. On the other hand, a set of skews that minimize the clock period can be compute by iterating timing analysis with a procedure that adjusts the clock skew at every register. The routine that adjusts clock skew would observe the difference between the input slack and output slack at each register and make skew adjustments to compensate for any differences. By repeating such a timing analysis after each skew adjustment, the effect of the adjustment can be propagated globally forcing changes at other register locations. Such an iterative procedure usually converges within a few iterations and produces skews that minimize the clock period.

One way of adjusting skew at each register is to apply an update to the skew in the following manner:

$$\text{skew}_i \leftarrow \text{skew}_i + \gamma \times (\text{outputslack}_i - \text{inputslack}_i)$$

Figure 6:
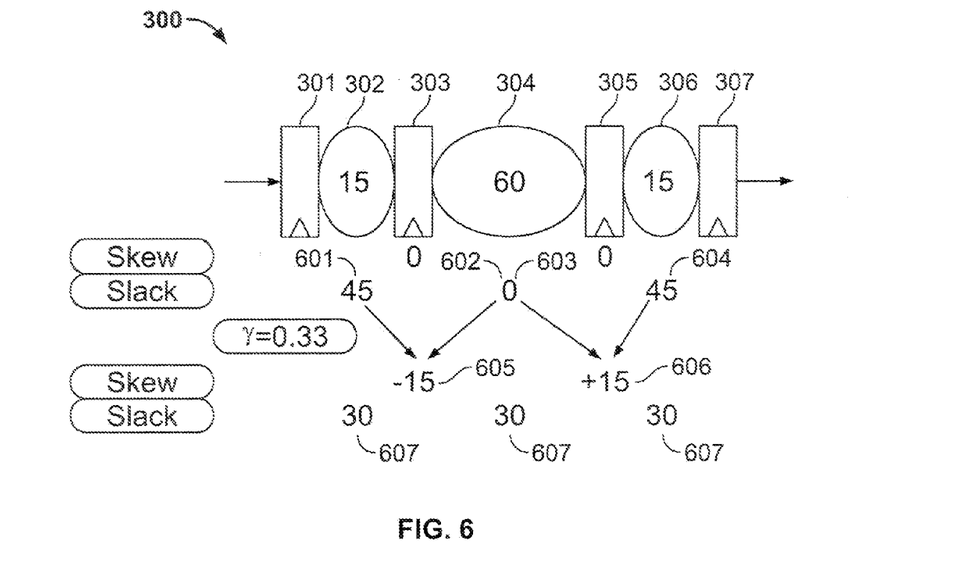
FIG. 6 shows an example of a method according to an embodiment of the present invention.

Only a portion of the slack difference between the two sides is applied to the skew because a large value of $\gamma$ may cause wild swings in the skew that prevent the method from converging. An example of this process is illustrated in FIG. 6 for the circuit of FIGS. 3-5. The method starts with a timing analysis that establishes slack at every point in the circuit. The input slack 601 at register 303 is 45 while the output slack 602 is 0, and input slack 603 to register 305 is 0 while the output slack 604 is 45. The skews are adjusted using a $\gamma$ set to 0.33. This produces a skew 605 of −15 at register 303 (0.33×(0−

45)) and skew 606 of +15 at register 305 (0.33×(45−0)). With these skews the slacks 607 are balanced and the method has converged.

If the timing analysis tool is not designed to deal with clock skews as part of the virtual retiming procedure described above, then as an alternative, a positive or negative delay can be added to all input and output edges at a register to mimic the effect of a retiming. This has the same effect as a applying a clock skew to the register. This alternative will work as long as the timing analysis is capable of handling negative delays at the register edges.

It will be understood that virtual retiming as just described does not replace actual retiming, but may be taken into account in the retiming as noted below.

Figure 7:
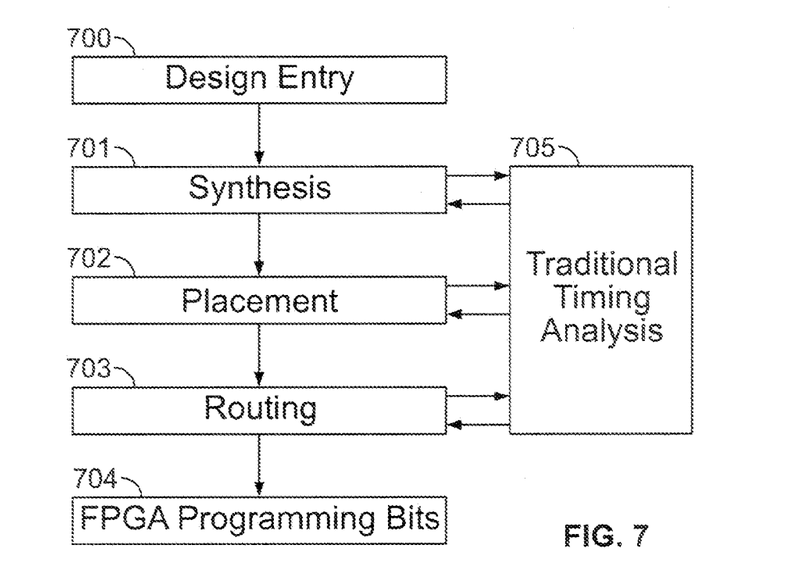
FIG. 7 shows a known programmable device configuration design flow.
Figure 8:
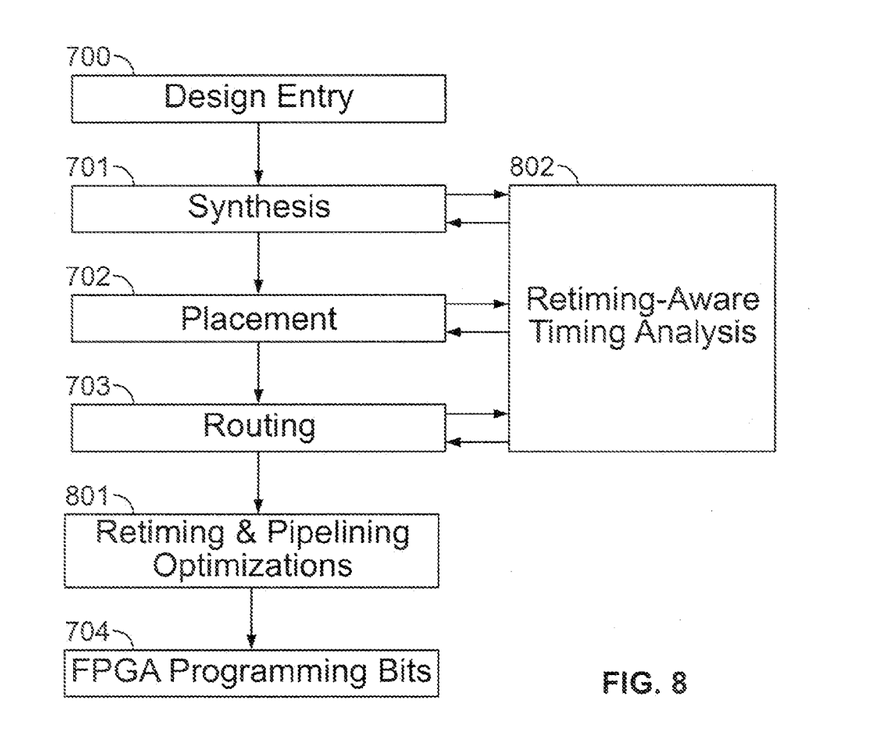
FIG. 8 shows a programmable device configuration design flow in accordance with embodiments of the invention.

There are several ways in which programmable device configuration software, running on a suitable processor such a personal computer or workstation, can process the circuit specifications entered by a user in accordance with the foregoing discussion, with awareness of the availability of retiming. One example is illustrated in FIGS. 7 and 8. FIG. 7 is a standard design flow that begins with design entry 700 and goes through the steps of synthesis 701, placement 702 and routing 703 before producing programming bits for the final implementation 704 of the user logic design in the target device. Each of the synthesis, placement and routing 701-703 is carried out based on a conventional or traditional timing analysis 705 that does not take the possibility of subsequent retiming into account. In accordance with embodiments of the invention, the design flow of FIG. 7 can be modified as shown in FIG. 8. Retiming 801 now precedes final implementation 704. Each of the synthesis, placement and routing 701-703 is carried out based on a timing analysis 802 that takes the possibility of subsequent retiming into account, using any combination of one or more of the foregoing techniques of sequential timing analysis, cycle slack, and skew-based virtual retiming.

Thus it is seen that a programmable device in which a configuration is implemented with "awareness" of the availability of later retiming, identify cyclic logic paths, and in particular those cyclic paths that are critical and near-critical, so that those paths can be optimized, while other paths remain available to be shortened by retiming, has been provided.

Instructions for carrying out a method according to this invention for programming a programmable device may be encoded on a machine-readable medium, to be executed by a suitable computer or similar device to implement the method of the invention for programming or configuring PLDs or other programmable devices. For example, a personal computer may be equipped with an interface to which a PLD can be connected, and the personal computer can be used by a user to program the PLD using suitable software tools as described above.

Figure 9:
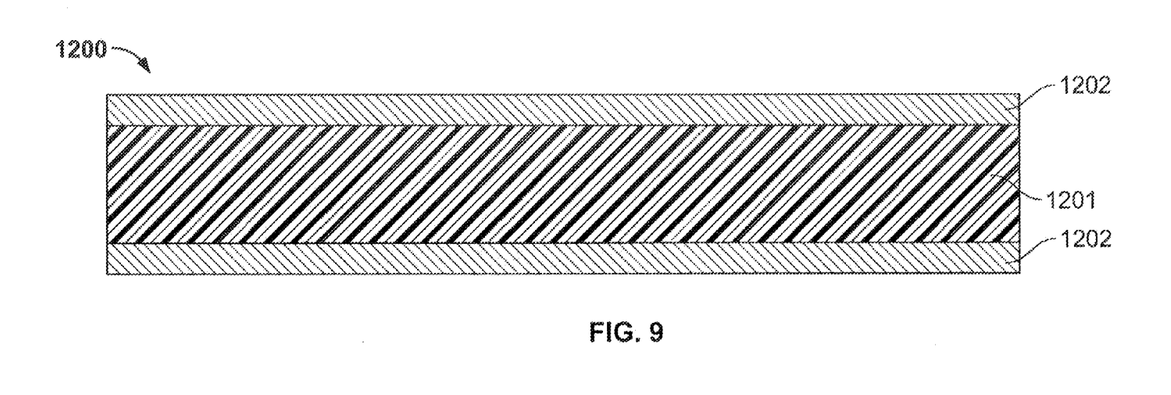
FIG. 9 is a cross-sectional view of a magnetic data storage medium encoded with a set of machine-executable instructions for performing the method according to the present invention.

FIG. 9 presents a cross section of a magnetic data storage medium 1200 which can be encoded with a machine executable program that can be carried out by systems such as the aforementioned personal computer, or other computer or similar device. Medium 1200 can be a floppy diskette or hard disk, or magnetic tape, having a suitable substrate 1201, which may be conventional, and a suitable coating 1202, which may be conventional, on one or both sides, containing magnetic domains (not visible) whose polarity or orientation can be altered magnetically. Except in the case where it is magnetic tape, medium 1200 may also have an opening (not shown) for receiving the spindle of a disk drive or other data storage device.

The magnetic domains of coating 1202 of medium 1200 are polarized or oriented so as to encode, in manner which may be conventional, a machine-executable program, for execution by a programming system such as a personal computer or other computer or similar system, having a socket or peripheral attachment into which the PLD to be programmed may be inserted, to configure appropriate portions of the PLD, including its specialized processing blocks, if any, in accordance with the invention.

Figure 10:
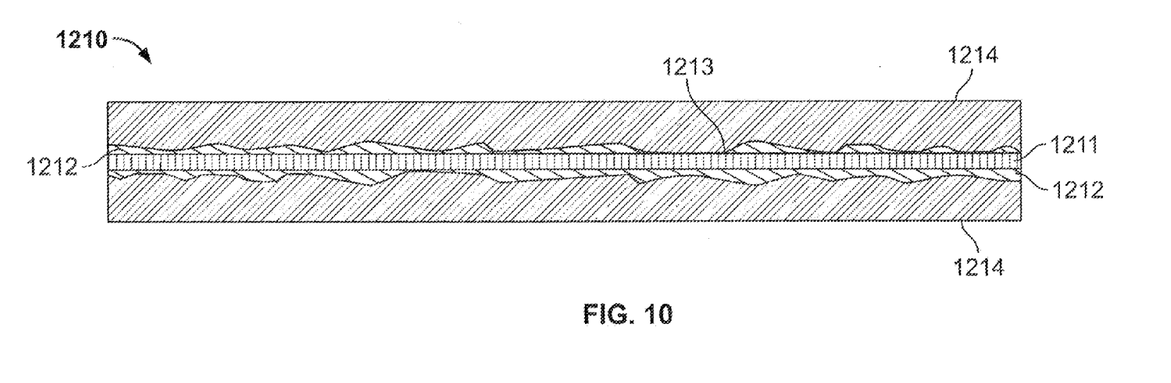
FIG. 10 is a cross-sectional view of an optically readable data storage medium encoded with a set of machine executable instructions for performing the method according to the present invention.

FIG. 10 shows a cross section of an optically-readable data storage medium 1210 which also can be encoded with such a machine-executable program, which can be carried out by systems such as the aforementioned personal computer, or other computer or similar device. Medium 1210 can be a conventional compact disk read-only memory (CD-ROM) or digital video disk read-only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 1210 preferably has a suitable substrate 1211, which may be conventional, and a suitable coating 1212, which may be conventional, usually on one or both sides of substrate 1211.

In the case of a CD-based or DVD-based medium, as is well known, coating 1212 is reflective and is impressed with a plurality of pits 1213, arranged on one or more layers, to encode the machine-executable program. The arrangement of pits is read by reflecting laser light off the surface of coating 1212. A protective coating 1214, which preferably is substantially transparent, is provided on top of coating 1212.

In the case of magneto-optical disk, as is well known, coating 1212 has no pits 1213, but has a plurality of magnetic domains whose polarity or orientation can be changed magnetically when heated above a certain temperature, as by a laser (not shown). The orientation of the domains can be read by measuring the polarization of laser light reflected from coating 1212. The arrangement of the domains encodes the program as described above.

A PLD 140 programmed according to the present invention may be used in many kinds of electronic devices. One possible use is in a data processing system 1400 shown in FIG. 11. Data processing system 1400 may include one or more of the following components: a processor 1401; memory 1402; I/O circuitry 1403; and peripheral devices 1404. These components are coupled together by a system bus 1405 and are populated on a circuit board 1406 which is contained in an end-user system 1407.

Figure 11:
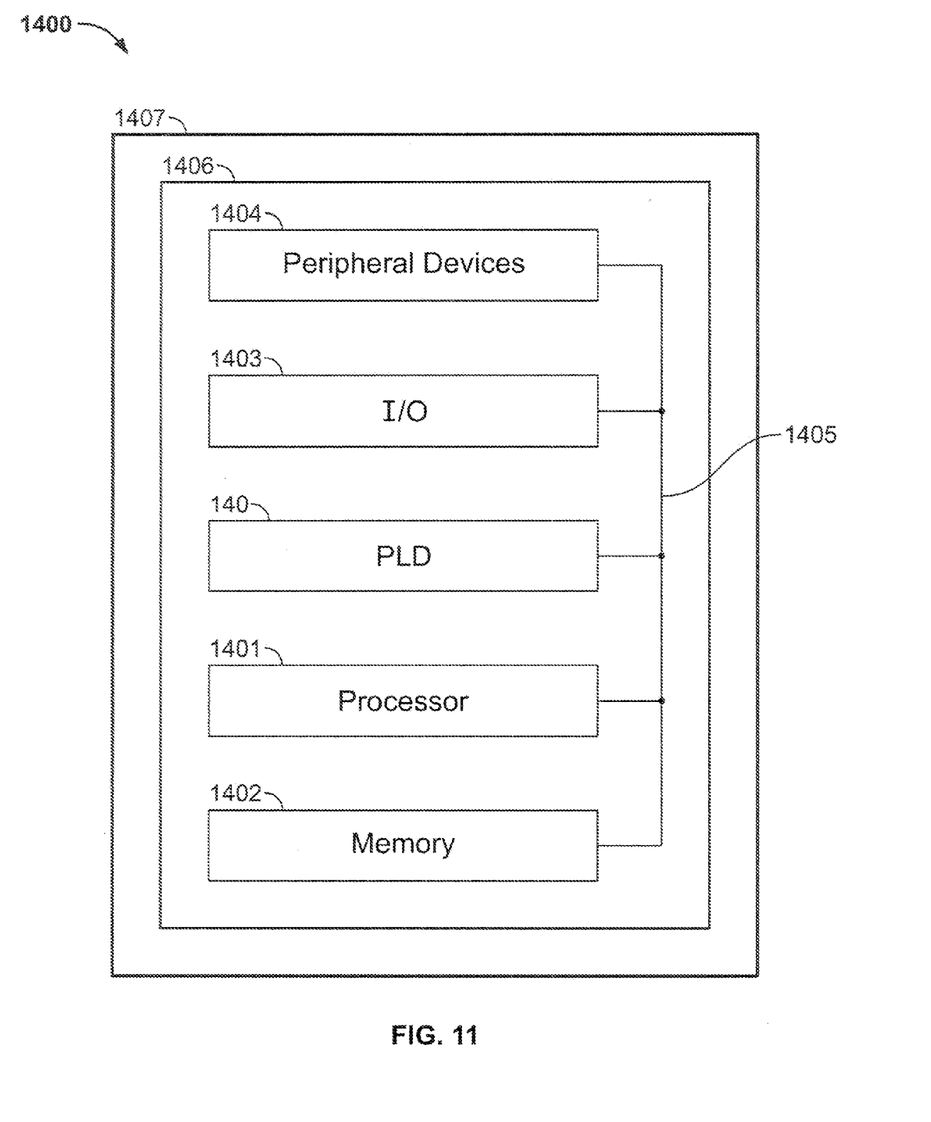
FIG. 11 is a simplified block diagram of an illustrative system employing a programmable logic device incorporating the present invention.

System 1400 can be used in a wide variety of applications, such as computer networking, data networking, instrumentation, video processing, digital signal processing, or any other application where the advantage of using programmable or reprogrammable logic is desirable. PLD 140 can be used to perform a variety of different logic functions. For example, PLD 140 can be configured as a processor or controller that works in cooperation with processor 1401. PLD 140 may also be used as an arbiter for arbitrating access to a shared resources in system 1400. In yet another example, PLD 140 can be configured as an interface between processor 1401 and one of the other components in system 1400. It should be noted that system 1400 is only exemplary, and that the true scope and spirit of the invention should be indicated by the following claims.

Various technologies can be used to implement PLDs 140 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. A method of configuring an integrated circuit device with a user logic design, said method comprising:
analyzing said user logic design to identify critical and near-critical cyclic logic paths within said user logic design;
applying timing optimizations other than retiming to said critical and near-critical cyclic logic paths; and
retiming logic paths without retiming said critical and near-critical cyclic logic paths.

2. The method of claim 1 wherein said integrated circuit device is a programmable integrated circuit device, said method further comprising:
generating a configuration bitstream based on said analyzing, said applying and said retiming; and
storing said configuration bitstream in memory of said programmable integrated circuit device.

3. The method of claim 1 wherein said analyzing is performed iteratively.

4. The method of claim 3 wherein:
said analyzing comprises determining circuit characteristics selected from the group consisting of slack, cycle slack, slack ratio and cycle slack ratio; and
said circuit characteristics are updated during said iterative analyzing.

5. The method of claim 3 wherein said analyzing comprises sequential timing analysis.

6. The method of claim 5 wherein said analyzing further comprises identifying reference points for said sequential timing analysis.

7. The method of claim 6 wherein said identifying reference points comprises:
selecting reference points from nodes in said critical and near-critical cyclic logic paths; and
updating said reference points as new ones of said critical and near-critical cyclic logic paths are identified during an iteration.

8. The method of claim 3 wherein said analyzing comprises updating lengths of said critical and near-critical cycles during each iteration based on results of said applying in a previous iteration.

9. The method of claim 1 wherein said analyzing comprises blending slack information and cycle slack information.

10. The method of claim 9 wherein said slack information and cycle slack information comprise slack ratios and cycle slack ratios.

11. The method of claim 1 wherein said retiming is performed by adjusting register delay.

12. The method of claim 1 wherein said retiming is performed by adjusting register clock skew.

13. The method of claim 1 wherein said applying timing optimizations other than retiming to said critical and near-critical cyclic logic paths further comprises excluding application of timing optimizations other than retiming to logic paths other than said critical and near-critical cyclic logic paths.

14. A non-transitory machine readable storage medium encoded with instructions for performing a method of configuring an integrated circuit device with a user logic design, said instructions comprising:
instructions to analyze said user logic design to identify critical and near-critical cyclic logic paths within said user logic design;
instructions to apply timing optimizations other than retiming to said critical and near-critical cyclic logic paths; and
instructions to retime logic paths without retiming said critical and near-critical cyclic logic paths.

15. The non-transitory machine readable storage medium of claim 14 wherein said integrated circuit device is a programmable integrated circuit device, said instructions further comprising:
instructions to generate a configuration bitstream based on said analyzing, said applying and said retiming; and
instructions to store said configuration bitstream in memory of said programmable integrated circuit device.

16. The non-transitory machine readable storage medium of claim 14 wherein instructions to analyze comprise instructions to analyze iteratively.

17. The non-transitory machine readable storage medium of claim 16 wherein:
said instructions to analyze comprise instructions to determine circuit characteristics selected from the group consisting of slack, cycle slack, slack ratio and cycle slack ratio; said instructions further comprising:
instructions to update said circuit characteristics during said iterative analyzing.

18. The non-transitory machine readable storage medium of claim 16 wherein said instructions to analyze comprise instructions to perform sequential timing analysis.

19. The non-transitory machine readable storage medium of claim 18 wherein said instructions to analyze further comprise instructions to identify reference points for said sequential timing analysis.

20. The non-transitory machine readable storage medium of claim 19 wherein said instructions to identify reference points comprise:
instructions to select reference points from nodes in said critical and near-critical cyclic logic paths; and
instructions to update said reference points as new ones of said critical and near-critical cyclic logic paths are identified during an iteration.

21. The non-transitory machine readable storage medium of claim 16 wherein said instructions to analyze comprise instructions to update lengths of said critical and near-critical cycles during each iteration based on results of said applying in a previous iteration.

22. The non-transitory machine readable storage medium of claim 14 wherein said instructions to analyze comprise instructions to blend slack information and cycle slack information.

23. The non-transitory machine readable storage medium of claim 22 wherein said slack information and cycle slack information comprise slack ratios and cycle slack ratios.

24. The non-transitory machine readable storage medium of claim 14 wherein said instructions to retime comprise instructions to adjust register delay.

25. The non-transitory machine readable storage medium of claim 14 wherein said instructions to retime comprise instructions to adjust register clock skew.

26. The non-transitory machine readable storage medium of claim 14 wherein said instructions to apply timing optimizations other than retiming to said critical and near-critical cyclic logic paths further comprise instructions to exclude timing optimizations other than retiming from application to logic paths other than said critical and near-critical cyclic logic paths.

* * * * *